United States Patent [19]
Kishi

[11] Patent Number: 6,041,329
[45] Date of Patent: *Mar. 21, 2000

[54] AUTOMATED MESSAGE PROCESSING SYSTEM CONFIGURED TO AUTOMATICALLY MANAGE INTRODUCTION OF REMOVABLE DATA STORAGE MEDIA INTO MEDIA LIBRARY

[75] Inventor: Gregory Tad Kishi, Oro Valley, Ariz.

[73] Assignee: International Business Machines Corporation, Armonk, N.Y.

[ * ] Notice: This patent is subject to a terminal disclaimer.

[21] Appl. No.: 08/865,277

[22] Filed: May 29, 1997

[51] Int. Cl.⁷ .................................................. G06F 17/30
[52] U.S. Cl. ............................ 707/100; 711/111; 711/161
[58] Field of Search ......................... 707/1–10, 100–104, 707/200–206; 711/4, 112, 113; 364/927.81, 952.31, 952.6, 959.3; 395/500

[56] References Cited

U.S. PATENT DOCUMENTS

| | | | |
|---|---|---|---|
| 4,467,421 | 8/1984 | White ....................................... | 364/200 |
| 4,638,424 | 1/1987 | Beglin et al. ............................ | 364/200 |
| 4,755,928 | 7/1988 | Johnson et al. ......................... | 364/200 |
| 4,769,782 | 9/1988 | Iwanaga ................................. | 364/900 |
| 5,088,026 | 2/1992 | Bozman et al. ........................ | 395/425 |
| 5,155,835 | 10/1992 | Belsan .................................... | 395/425 |
| 5,247,638 | 9/1993 | O'Brien et al. ......................... | 395/425 |
| 5,386,545 | 1/1995 | Gombos, Jr. et al. .................. | 395/575 |
| 5,403,639 | 4/1995 | Belsan et al. ........................... | 707/204 |
| 5,408,630 | 4/1995 | Moss ...................................... | 395/425 |
| 5,410,697 | 4/1995 | Baird et al. ............................. | 395/650 |
| 5,438,674 | 8/1995 | Keele et al. ............................. | 711/4 |
| 5,455,926 | 10/1995 | Keele et al. ............................ | 711/112 |
| 5,491,810 | 2/1996 | Allen ...................................... | 395/444 |
| 5,513,336 | 4/1996 | Vishlitzky et al. ..................... | 395/463 |
| 5,519,844 | 5/1996 | Stallmo .................................. | 395/441 |
| 5,537,568 | 7/1996 | Yanai et al. ............................. | 395/445 |
| 5,546,557 | 8/1996 | Allen et al. ............................. | 395/438 |
| 5,584,008 | 12/1996 | Shimada et al. ....................... | 395/441 |
| 5,598,528 | 1/1997 | Larson et al. ...................... | 395/182.05 |
| 5,613,154 | 3/1997 | Burke et al. ............................ | 395/821 |
| 5,911,148 | 6/1999 | Anglin et al. ........................... | 711/111 |

OTHER PUBLICATIONS

*IBM Technical Disclosure Bulletin*, vol. 37, No. 06A, Jun. 1994, "High Capacity DASD Dual–Copy Secondary to Multiple 3390 Primary Devices", pp. 493–497.

"Multitasking Volume Backup in a Space Management Program", T. W. Beglin, *IBM Technical Disclosure Bulletin*, vol. 24, No. 5, Oct. 1981, pp. 2418–2419.

"Minimizing Storage Device Contention in a Multi–Host, Multi–Tasking Environment", *IBM Technical Disclosure Bulletin*, vol. 35, No. 1A, Jun. 1992, pp. 170–173.

"Logical Grouping of Data Storage Media in a Library System", *IBM Technical Disclosure Bulletin*, vol. 35, No. 5, Oct. 1992, pp. 17–20.

"Scratch Tape Drive Allocation Algorithm for Multiple Tape Libraries", *IBM Technical Disclosure Bulletin*, vol. 36, No. 11, Nov. 1993, pp. 249–251.

"Requesting Operator to Preload Integrated Cartridge Loader in Managed Manual Mode Library", *IBM Technical Disclosure Bulletin*, vol. 39, No. 04, Apr. 1996, p. 271.

"Automatic Cartridge Facility Usage in a 3495 Library", *IBM Technical Disclosure Bulletin*, vol. 39, No. 10, Oct. 1996, pp. 55–56.

*Primary Examiner*—Ruay Lian Ho
*Attorney, Agent, or Firm*—Gray Cary Ware Freidenrich

[57] ABSTRACT

Replacing a human operator, an automated message processing system communicates with a data storage subsystem. The automated message processing system receives messages from the data storage subsystem signalling the insertion of an item of removable data storage media, such as a tape cartridge, into a tape library of the data storage subsystem. Such messages are selectively routed to one of many specialized expert local facilities, or ELFs. In response to input from the data storage subsystem, the ELFs generate appropriate output messages, ultimately transmitted to the data storage subsystem to direct cataloguing, categorization, and even labeling of inserted media.

51 Claims, 8 Drawing Sheets

AUTOMATED MESSAGE PROCESSING SYSTEM CONFIGURED TO AUTOMATICALLY MANAGE INTRODUCTION OF REMOVABLE DATA STORAGE MEDIA INTO MEDIA LIBRARY

CROSS REFERENCE TO RELATED APPLICATION

This application contains subject matter related to subject matter in U.S. Pat. application Ser. No. 08/865,444, filed May 29, 1999, commonly assigned with this application, and now issued as U.S. Pat. No. 5,511,148.

BACKGROUND OF THE INVENTION

1. Field of the Invention

The present invention relates to a system that processes and responds to messages generated by a digital data processing machine. More particularly, the invention concerns an apparatus, article of manufacture, and method for receiving both immediate-response and delayed-response messages from a data storage subsystem, selectively routing the messages to specialized expert local facilities (ELFs), performing designated functions at the ELFs, generating an appropriate output message, and transmitting the output message to the data storage subsystem. According to the invention, these messages concern the insertion of removable data storage media into a library of the data storage subsystem.

2. Description of the Related Art

Many different machines require operator supervision. Although automation is increasing, some type of management by an operator is still required for many simple machines such as drill presses, facsimile machines, and sewing machines. With more complicated machines, an operator is even more important, to perform critical and often complicated duties.

For example, most mass data storage systems require some type of operator support. Such data storage systems often store customer data on magnetic tapes, magnetic disk drives, or a combination of the two. These systems need an operator to perform error/exception handling, to backup data, to configure hardware devices, and to perform other functions. Furthermore, in storage libraries employing portable data storage units, such as tapes, operators must manage the media pool. This involves, for instance, supplying blank media, labelling tapes, advising the system when new tapes are introduced, and the like.

Thus, the operator provides the mass storage system with a number of benefits. On the other hand, use of an operator also comes with a number of drawbacks. One drawback, for example, is the cost of paying a highly trained person to monitor the data storage system. It may even be necessary to have an operator at hand twenty-four hours a day in systems that store particularly important data, such as automated teller machines, telephone directory information, internationally accessible data, and the like. In these systems, the cost of the operator can be substantial.

Another drawback of human operators is the potential for human mistakes. And, with human operators comes the possibility of human work scheduling problems. The operator's absence from the data storage system at a critical time may have serious consequences. For example, recovery from certain types of system errors may be impossible without operator intervention, thus rendering the entire storage system inoperative.

As a further example, one particularly important yet difficult operator task involves the introduction of removable media such as tape cartridges into a data storage library of a mass storage system. Many mass storage systems include tape libraries supervised by a library manager that oversees a plurality of tape cartridges and multiple tape drives. In some cases, the tape library is managed by a storage controller.

When a tape is introduced into the library, the human operator must perform the following sequence. First, the operator manually inserts the tape into an input facility, such as a slot provided in the library. Next, using a keyboard coupled to the library manager, the operator determines whether the tape has already been catalogued. Cataloguing a tape involves recording various information about the tape in a catalog, maintained by the library. Then using a keyboard coupled to the storage controller, the operator ascertains the tape's category. The operator then uses the storage controller's keyboard to catalogue the tape (if not already catalogued), and to establish an appropriate category for the tape. To complete this step, the operator must manually instruct the library to sequentially and individually load and process the cartridge. This may be time consuming, especially if multiple tape cartridges are being introduced into the library, each requiring the operators individual attention.

The need to facilitate insertion of new media into a data storage library is crucial to such mass storage systems. In this respect, the human operator performs an integral function. However, as discussed above, the use of a human operator has a number of limitations.

SUMMARY OF THE INVENTION

Broadly, the present invention concerns an automated message processing system for communicating with a data storage subsystem. The automated message processing system receives messages from a data storage subsystem signalling the introduction of an item of removable data storage media, such as a tape cartridge, into a tape library of the storage subsystem. Such messages are selectively routed to one of many specialized ELFs. In response to input from the data storage subsystem, each ELF performs a designated function such as the generation of generate appropriate output message for subsequent transmission to the data storage subsystem. These output messages may be used to direct cataloguing, categorization, and even labeling of inserted tapes. The automated message processing system of the invention may be implemented, for example, by programming a computer.

As a more detailed example, the automated message processing system includes a sorting and transmitting administrator (SANTA) coupled to the data storage subsystem to receive messages therefrom. The SANTA selectively routes each message to one of a plurality of expert logical facilities (ELFs) according to the content of the received message. The messages include, for example, immediate-response messages and delayed-response messages. The SANTA includes a command response unit coupled to the data storage subsystem, which receives immediate-response messages from the data storage subsystem and routes each immediate-response message to an appropriate one of the ELFs in response to routing criteria received at a routing input. The SANTA also includes a message console coupled to the data storage subsystem to receive delayed-response messages and route all delayed-response messages to a predetermined one of the ELFs.

Each of the plurality of ELFs includes one or more inputs each coupled to the command response unit, the message console, or an activating source such as a timer, external source, or another ELF. Each ELF "activates" in response to "stimuli" signals, responsively performing certain predetermined functions. These functions include generating an output message, and may also include processing of messages received from the SANTA.

The automated message processing system also includes a command generator coupled to the ELFs and the routing input of the command response unit. The command generator generates routing criteria specifying which of the ELFs to route each received immediate-response message, and forwards the routing criteria to the routing input. The command generator also receives output messages from the ELFs and creates formatted output messages by conforming the received output messages into a predetermined format. Furthermore, the command generator selects a destination in the data storage subsystem for each formatted output message, and appropriately dispatches the formatted output message to the selected destination.

In one embodiment, the invention may be implemented to provide a method for communicating with a data storage subsystem. In contrast, another embodiment of the invention may be implemented to provide an apparatus such as an automated message processing system. In still another embodiment, the invention may be implemented to provide a programmed product comprising signal-bearing media tangibly embodying a program of machine-readable instructions executable by a digital data processing apparatus to perform method steps for communicating with a data storage subsystem.

The invention affords its users with a number of distinct advantages. Chiefly, the invention facilitates automated processing of messages generated by a data storage subsystem, in replacement of a human operator, in order to manage the introduction of removable media into the storage subsystem. Thus, in a mass storage system, the invention is especially advantageous because it avoids the cost of paying a highly trained person to monitor the data storage system, avoids the possibility of human errors, and guarantees nonstop mechanized supervision of the system. The invention also provides a number of other advantages and benefits, which should be apparent from the following description of the invention.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

FUNCTIONAL COMPONENTS & INTERRELATIONSHIPS

Figure 1:
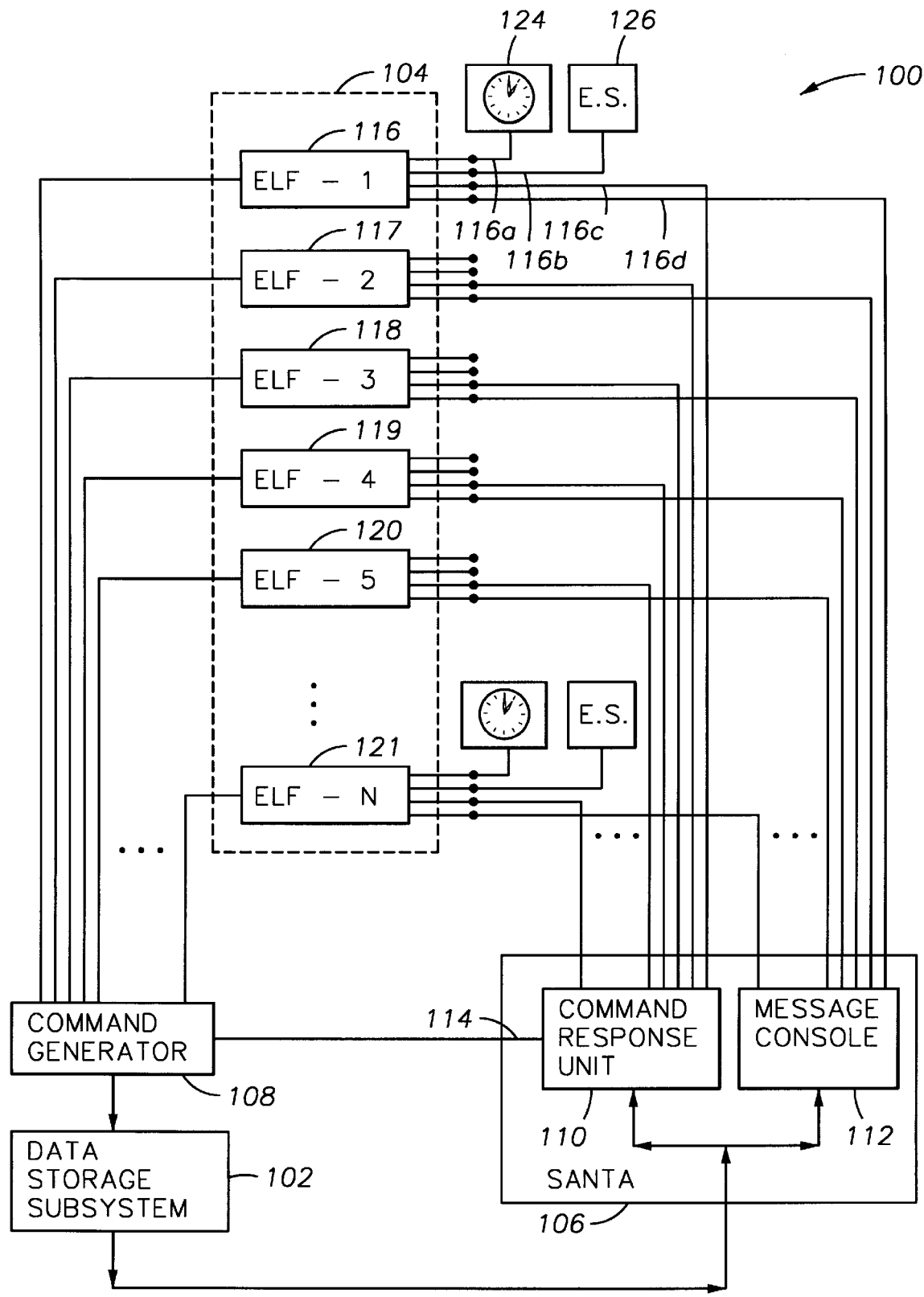
FIG. 1 is a block diagram showing functional components of an automated message processing system according to the invention.

One aspect of the invention concerns an automated message processing system, which may be embodied by various functional components and interrelationships. An example is given by the automated message processing system 100 of FIG. 1. As described in greater detail below, the components of the system 100 may be implemented with software functions, hardware devices, or a combination of both, depending upon the specific needs of the application.

Broadly, the automated message processing system 100 serves to communicate with a data storage subsystem 102. The automated message processing system 100 receives messages from the data storage subsystem 102, selectively routes each message to one of many specialized expert local facilities (ELFs) 104 for performance of a designated function and generation of an appropriate output message, and ultimately transmits the output message to the data storage subsystem 102.

Sorting and Transmitting Administrator (SANTA)

The system 100 includes a SANTA 106, which is coupled to the ELFs 104, the data storage subsystem 102, and a command generator 108. The SANTA 106, which may also be referred to as a "message director", includes a command response unit 110 and a message console 112. In the illustrated embodiment, the command response unit 110 and message console 112 are coupled to multiple ELFs 104. Generally, the SANTA 106 orchestrates forwarding of messages received from the data storage subsystem 102 to the appropriate one of the ELFs 104.

As explained in greater detail below, the SANTA 106 receives messages from the data storage subsystem 102, these messages include immediate-response messages and delayed-response messages. As known by those of ordinary skill, "immediate-response" messages are received by a processor in response to an output of that processor, while the processor is specifically waiting for that message before proceeding. In the illustrated example, after the command generator 108 sends a message to the data storage subsystem 102, the system 100 waits for the SANTA 106 to receive an immediate-response message from the data storage subsystem 102, as discussed in greater detail below.

"Delayed-response" messages are also received by a processor in response to an output of that processor, however the processor does not wait for that message after sending the original output. In the illustrated example, the command generator 108 sends a message to the data storage subsystem 102, then proceeds to other operations. At some later time, the SANTA 106 eventually receives the delayed-response message. In the mean time, the command generator 108 has been performing other tasks.

The command response unit 110 routes each immediate-response message to one of the ELFs 104 according to routing criteria received at a routing input 114. The message console 112 receives all delayed-response messages from the data storage subsystem 102, routing these messages to an appropriate one of the ELFs 104 according to the content of the delayed-response message.

Although not shown, the SANTA 106 may also include message queues for buffering messages to the ELFs 104.

Expert Local Facilities (ELFs)

As mentioned above, the system 100 includes a plurality of ELFs 104, each of which performs a limited and particular function called an "expert" function. As explained more thoroughly below, each expert function involves the processing of a number of specific input messages compatible with that ELF, where each message is processed by applying a predetermined processing routine particular to that message. Although other tasks may also be included, each processing routine results in generation of an output message, which is ultimately directed to the command generator 108. Although more than one ELF may perform a given function, preferably each ELF performs a unique function with respect to the other ELFs.

Each ELF includes one or more inputs for receiving messages and stimuli. Each input is coupled to the command response unit 110, the message console 112, a timer, or an external source. For example, in the case of the ELF 116, a first input 116 a is coupled to a timer 124, a second input 116b is coupled to an external source 126, a third input 116d is coupled to the message console 112, and a fourth input 116c is coupled to the command response unit 110. The external source 126 may comprise a component external to the system 100, or even another ELF.

As discussed in greater detail below, an ELF "activates" in response to a stimulus signal received on the inputs, performing certain appropriate predetermined actions accordingly. These actions include generation of an output message, which is directed to the command generator 108 as discussed in greater detail below.

In an alternative embodiment, the SANTA 106 may be coupled to one or more external sources, permitting the ELFs to additionally receive external stimuli via the SANTA 106 rather than from a directly coupled external source such as 126.

Command Generator

Coupled to each ELF 104, the command generator 108 receives output messages generated by the ELFs 104. The command generator 108 places these output messages in a predetermined format compatible with the data storage subsystem 102. The command generator 108 also selects a destination in the data storage subsystem 102 for sending each formatted output message, and ultimately dispatches the formatted output message to that destination. This may be achieved, for example, by selecting an appropriate component and/or address of the data storage subsystem 102, and sending the formatted output message to that component and/or address.

In addition to the ELFs 104, the command generator 108 is also coupled to the routing input 114 of the command response unit 110. The command generator 108 generates routing criteria specifying one or more ELFs 104 for the command response unit 110 t route each immediate-response message received by the unit 110 from the data storage subsystem 102. The command generator 108 forwards the routing criteria to the command response unit 110.

As an example, the routing criteria may identify an incoming message, a message identification code, a time window when the message is expected, or another characteristic of the window. As an alternative, the routing criteria may comprise a file or linked list or a group of messages identified by the first and/or last message in the group.

Implementation of Automated Message Processing System: One Example

The automated message processing system 100 may implemented in a number of different ways, depending upon the specific needs of the application. As an example, the components of FIG. 1 may be implemented using discrete circuitry, application-specific integrated circuitry, programmable circuit components, logic circuitry, or a combination.

As another alternative, some of the features of the system 100 may be implemented in software, while others are implemented using suitable hardware.

Figure 2:
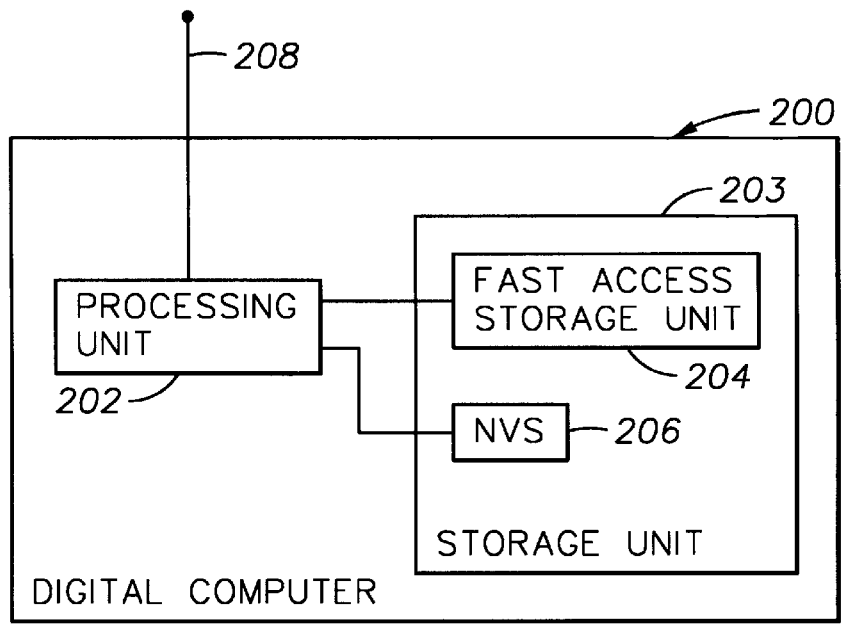
FIG. 2 is an illustrative hardware implementation of the automated message processing system of the invention.

In the preferred embodiment, however, the system 100 is implemented in software, by using a digital computer to execute a sequence of programming instructions. In this embodiment, then, the components of FIG. 1 are software modules or functional units, rather than physical hardware components. This embodiment may therefore be implemented using a digital computer, as shown in FIG. 2.

The computer 200 includes a processing unit 202, such as a microprocessor or other processing machine, coupled to a storage unit 203. In the present example, the storage unit 203 includes a fast-access storage unit 204 and a nonvolatile storage unit 206. The fast-access storage unit 204 preferably comprises random access memory, and may be used to store the programming instructions executed by the processing unit 202 during such execution. The nonvolatile storage unit 206 may comprise, for example, one or more magnetic data storage disks such as a "hard drive", a tape drive, or any other suitable storage device. The computer 200 also includes an input/output 208, such as a line, bus, cable, electromagnetic link, or other means for exchanging data with the processing unit 202.

Despite the specific foregoing description, ordinarily skilled artisans (having the benefit of this disclosure) will recognize that the system 100 may be still implemented in a computer of different construction, without departing from the scope of the invention. As a specific example, one of the storage units 204/206 may be eliminated; furthermore, the processing unit 202 may be provided with on-board storage, even though the storage unit 203 is shown separate from the processing unit 202. Moreover, some or all of the components 202/204/206 may be shared by other hardware devices (not shown) such as the data storage subsystem 102.

Application of the Automated Message Processing System: One Example

As one particularly useful application of the system 100, the system 100 may be used in a mass storage subsystem to serve as an automated system administrator, in substitution for a human storage administrator. In this embodiment, the storage subsystem constitutes the digital data storage subsystem 102 that exchanges messages with the automated message processing system 100.

Figure 3:
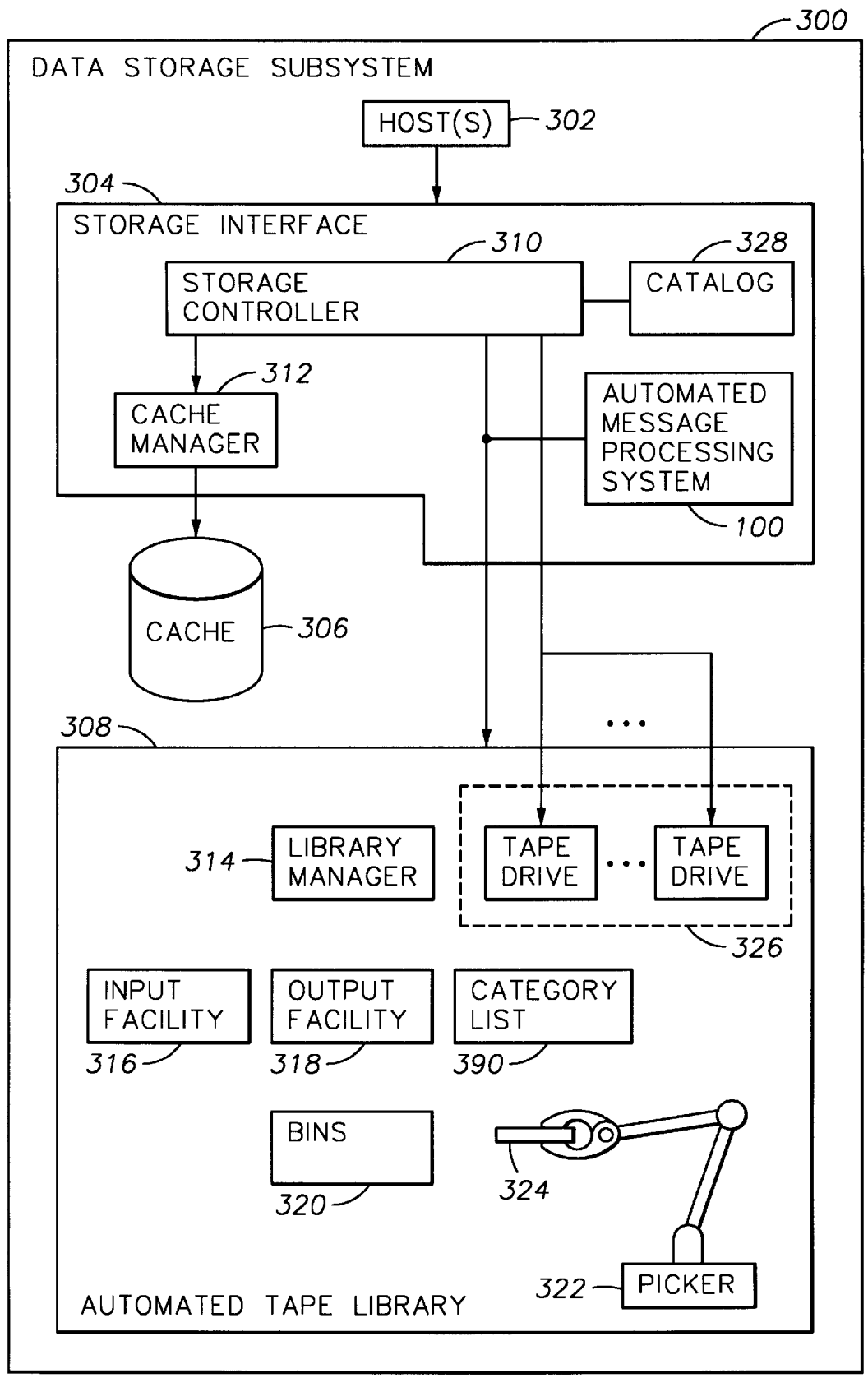
FIG. 3 is a specific hardware implementation using the automated message processing system of the invention as an automated system administrator for a mass data storage subsystem.

FIG. 3 depicts an example of a data storage subsystem 300, and its hardware components and interconnections. The subsystem 300 includes one or more hosts 302 a storage interface 304, and an automated tape library 308. Optionally, for reasons explained below, the subsystem 300 may also include a cache 306. In the illustrated embodiment, the automated message processing system 100 is implemented within a storage interface 304, where it is coupled to a storage controller 310 and the tape library 308.

Broadly, the hosts 302 comprises one or more units that utilize data stored on the cache 306 and library 308. The storage interface 304 exchanges data between the hosts 302 and the cache 306, and between the hosts 302 and the library 308. These exchanges are conducted in accordance with commands from the host 302. The storage interface 304 also oversees data transfers from the cache 306 to the library 308 (e.g., "destaging" operations) and data transfers from the library 308 to the cache 306 (e.g., "staging" operations due to cache misses).

The automated tape library 308 comprises an apparatus that manages the storage, loading, unloading, movement, writing, and reading of tape cartridges ("tapes"), such as the tape 324. For ease of illustration, the terms "tape" and "cartridge" are used interchangeably. And, although this description specifically references the use of tape cartridge and tape drives, any other removable media and corresponding drives may be used. As an example, other removable media may include optical disk cartridges, magnetic data storage diskettes, portable hard drive units, etc. Furthermore, "tape" cartridges may employ magnetic storage techniques, as well as optical storage or another means, without departing from the scope of the invention.

In the illustrated embodiment, the tapes 324 are stored in bins 320. A picker 322, such as robotic arm, selectively collects tapes 324 from an input facility 316, carries tapes to an output facility 318, and exchanges tapes as required with tape drives 326. The input facility 316, for example, may include one or more tape storage slots along with a batch loading mechanism (not shown) for receiving tapes from an operator. Similarly, the output facility 318 may include one or more tape storage slots along with a batch output mechanism (not shown) for transferring tapes from the library 308 to an operator.

The tape library 308 may comprise a new design, or a conventional tape library. As an example, the tape library 308 may comprise an IBM model 3494 tape library with at least (1) an IBM 3490 model C2A tape drive to access the following types of tapes: the IBM CST tape (standard cartridge system tape, 18 or 36 track format), and the IBM ECCST tape (enhanced capacity cartridge system tape, 36 track format), and (2) an IBM 3590 model B2A tape drive to access the IBM HPCT tape (high performance cartridge tape, 128 track format). The library 308 also includes a tape library manager 314, which oversees operations of the library 308, and may comprise a new design or a conventional manager for the specific configuration embodied by the library 308. In the illustrated example, the library manager 314 may comprise the library manager used in the IBM model 3494 tape library.

Turning to the components of the storage interface 304, the cache 306, an optional component, may be included in the subsystem 300 to provide a fast-access data storage location. As discussed in greater detail below, newly received data may be first stored in the cache 306, and then migrated to the tape library 308 upon satisfaction of some criteria, such as a period or level of non-use. In an illustrative embodiment, the cache 306 may comprise a magnetic disk storage device such as a high data capacity "hard drive."

The storage interface 304 includes a storage controller 310, a cache manager 312, and a catalog 328. The cache manager 312 oversees operations of the cache 306, and may comprise a new design or a conventional manager for the type of data storage device embodied by the cache 306. In the illustrated example, the cache manager 312 may comprise a disk drive controller. The catalog 328 is used by the storage controller 310 to maintain information about the location of the data stored within the data storage subsystem 300.

The storage controller 310 directs operations of the managers 312/314 and also moves data to/from the tape drives 326. The storage controller 310 receives commands and data from the hosts 302, and issues appropriate commands to direct the managers 312/314 to take the necessary actions to execute the hosts' commands. The storage controller 310 may comprise a digital processing apparatus such as a microprocessor, personal computer, or more advanced processing machine.

Preferably, the storage controller 310 maintains a status-list, showing each of the tape drives 326 as being "unavailable" or "available". Likewise, the library manager 314 also maintains a status-list, independently showing the unavailable/available status of each tape drive 326.

In an exemplary implementation, the hosts 302 may be embodied by a variety of types and numbers of units, such as: mainframe or personal computers; workstations; user consoles such as keyboards, terminals, or other input devices; application programs; etc. Also as an example, the storage interface 304 may be implemented by executing appropriate software programming with a processing unit such as a IBM model RS6000 RISC microprocessor. The storage interface 304 and cache 306 may be embodied, for example, in an IBM model 3494 B16 virtual tape server. In one exemplary embodiment, the automated tape library 308 may comprise an IBM model 3494 tape library.

In environment of the foregoing embodiment, external sources such as the external source 126 may comprise the library manager 314, a user console (not shown) coupled to the storage interface 304 or library 308, a customer engineer service panel, a connection to another ELF, or another suitable source.

If desired, the invention may be implemented in the foregoing embodiment of data storage subsystem 300 to provide a virtual tape storage (VTS) system. VTS systems chiefly store data on tape, taking advantage of this inexpensive means of long term data storage. However, to expedite data exchanges, data is cached in a DASD cache, which may be embodied in the cache 306. According to a predetermined criteria, such as the data's age or recency/frequency of use, the data is backed up on tape, e.g. the tape library 308. Cache misses result in older data being retrieved from tape and stored again in the DASD cache.

Additional information about VTSs, some of which are well known in the art, is provided by the following references: (1) U.S. Pat. No. 4,467,421, entitled "Virtual Storage System & Methods", issued Aug. 21, 1984, (2) U.S. Pat. application Ser. No. 08/707,891, entitled "Virtual Integrated Cartridge Loader for Virtual Tape Storage System", filed on Sep. 10, 1996 in the names of Carlson et al, and (3) U.S. Pat. application Ser. No. 08/778,118, entitled "Outboard Data Migration in a Volume Stacking Library", filed on Jan. 2, 1997, in the name of J. W. Peake. The contents of the foregoing references are incorporated by reference.

OPERATION

In addition to the various hardware embodiments described above, a different aspect of the invention concerns a method for communicating with a data storage subsystem.

Signal-Bearing Media

Such a method may be implemented, for example, by operating an appropriate processing unit, such as the computer 200 (FIG. 2) or the storage interface 304 (FIG. 3), to execute a sequence of machine-readable instructions. These instructions may reside in various types of signal-bearing media. In this respect, one aspect of the present invention concerns a signal-bearing media tangibly embodying a program of machine-readable instructions executable by a digital data processor to perform a method to communicate with a data storage subsystem.

Figure 4:
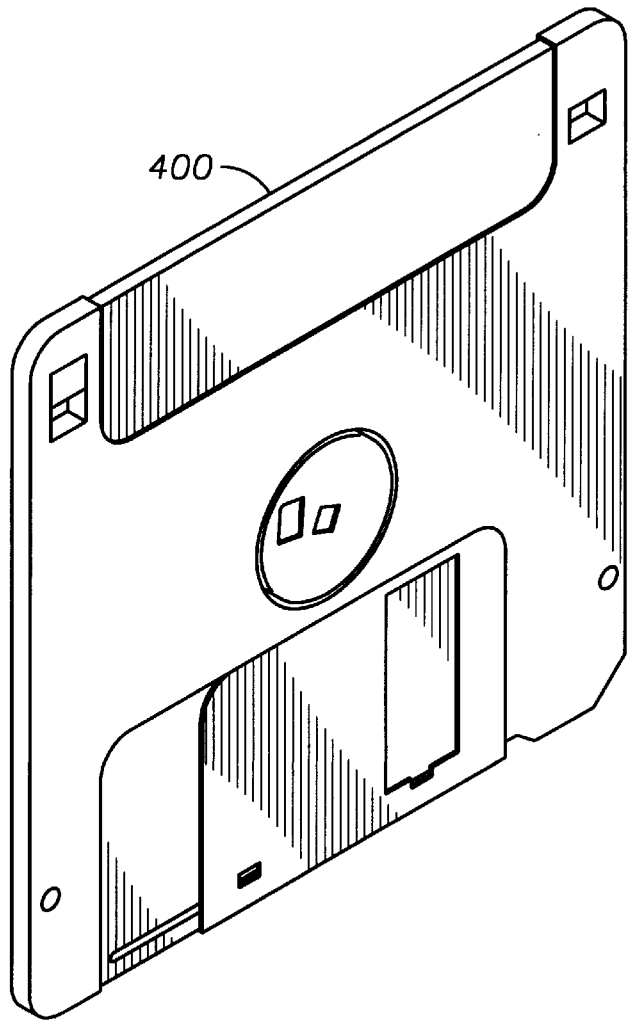
FIG. 4 is an exemplary signal bearing medium according to the invention.

This signal-bearing media may comprise, for example, RAM embodied by the fast-access storage unit 204, or some memory accessible by the storage interface 304. Alternatively, the instructions may be contained in another signal-bearing media, such as a magnetic data storage diskette 400 (FIG. 4). Whether contained in the diskette 400, fast-access storage unit 204, storage interface 304, or elsewhere, the instructions may instead be stored on another type of data storage medium such as DASD storage (e.g., a conventional "hard drive" or a RAID array), magnetic tape, electronic read-only memory (e.g., CD-ROM or WORM), an optical storage device (e.g. WORM), paper "punch" cards, or other suitable signal-bearing media including transmission media such as digital and analog and communication links and wireless. In an illustrative embodiment of the invention, the machine-readable instructions may comprise lines of compiled "C" language code.

General Sequence of Operation

Figure 5:
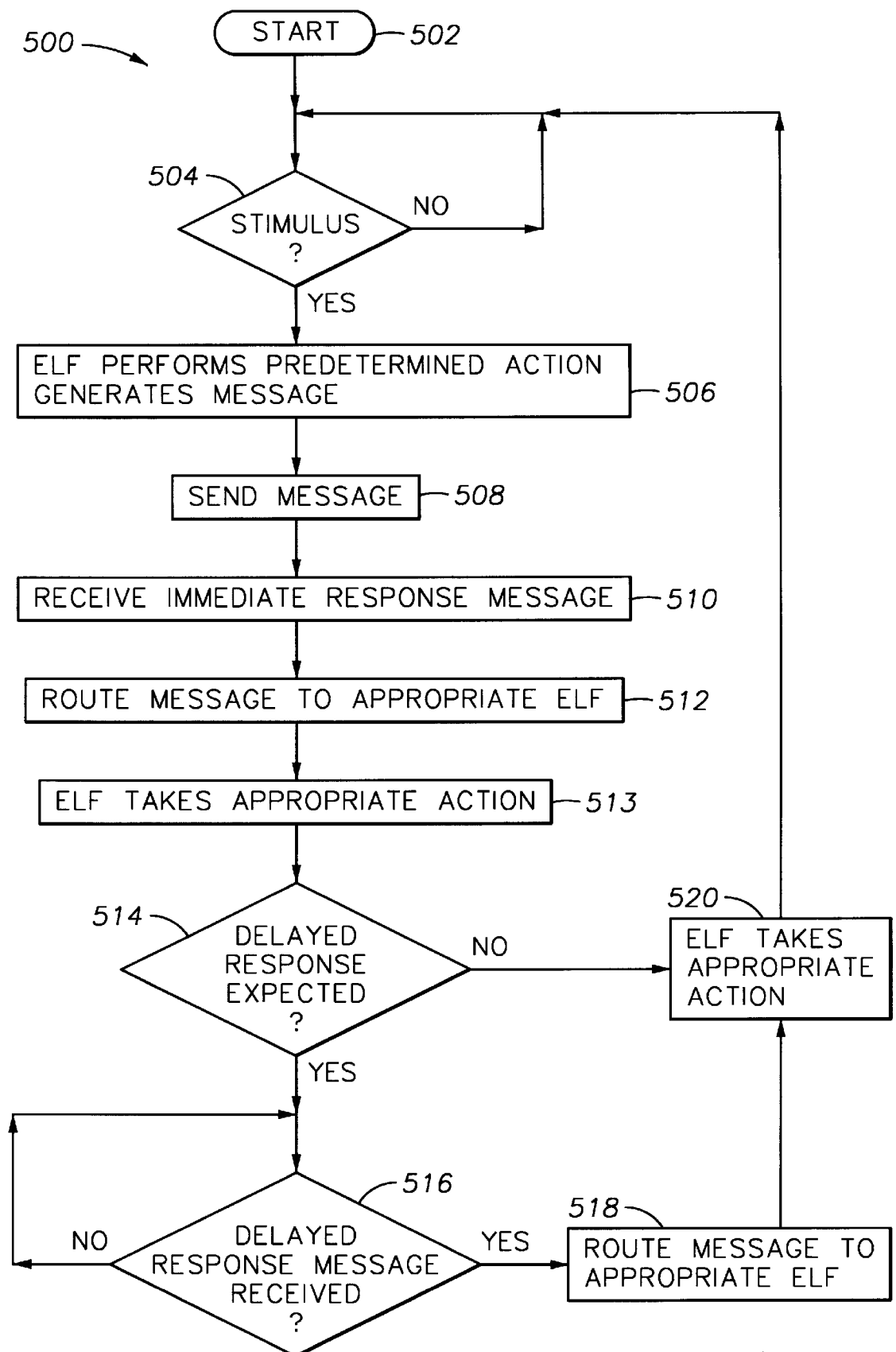
FIG. 5 is a flowchart depicting an illustrative operational sequence according to the invention.

FIG. 5 shows a sequence of method steps 500 to illustrate one example of the method aspect of the present invention. For ease of explanation, but without any limitation intended thereby, the example of FIG. 5 is described in the context of the automated message processing system 100 described above. FIG. 5 depicts task processing by the ELF 116, although these steps are similarly applicable to task processing in the other ELFs 117–121. For ease of illustration, the routine 500 depicts the full completion of a single task, in which the ELF 116 initiates action in response to an initiating stimulus, and performs subsequent follow-up in accordance with immediate-response and delayed-response messages.

After the steps are initiated in step 502, step 504 asks whether the ELF 116 has received an initiating stimulus. As shown below, an initiating stimulus triggers the ELF 116 to originate some action. The initiating stimulus contrasts with immediate-response and delayed-response messages, which are received by the ELF 116 during subsequent processing of an already-initiated task.

Initiating stimulus may be received at any of the inputs 116a–116d. Thus, the stimulus may comprise a timing event received from the timer 124, a signal from the external source 126, or a message from the data storage subsystem forwarded via the message console 112. Initiating stimuli may also be received from another ELF, in various ways. For instance, a second ELF may generate an initiating message and transmit back around to the first ELF, via the command generator 108, data storage subsystem 102, and SANTA 106. Or, the second ELF may constitute an external source (such as 126), in which case the second ELF sends the stimulus directly to the first ELF.

If stimulus has been received, step 504 advances to step 506, where the ELF 116 (receiving the stimulus) performs a predetermined action, which includes generation of an appropriate message in response to the stimulus. Each of the ELFs 104 is programmed to recognize certain types of stimuli, and perform one or more specific actions in response to each stimulus. Some specific examples of messages generated by the ELFs 104 are described in detail below.

After the ELF 116 generates the message, the message is sent in step 508. First, the ELF 116 passes the message to the command generator 108. Then, the command generator 108 places the message in a predetermined format, such as a specific format compatible with the data storage subsystem 102. Then (also in step 508), the command generator 108 dispatches the formatted message to an appropriate destination in the data storage subsystem 102. Preferably, the desired destination is identified by the message output by the ELF 116. Alternatively, the command generator 108 may choose the destination based upon the content of the ELF's output message. The command generator 108 may dispatch the message, for example, by transmitting the formatted message to a particular address in the data storage subsystem 102, where this address corresponds to the selected destination for the message.

In the present example, the formatted output message sent in step 508 requires a response before the system 100 can proceed. Thus, after dispatching the formatted output message, the system 100 waits for an immediate-response message. This occurs in step 510, where the SANTA 106 receives an immediate-response message, generated (not shown) by the data storage subsystem 102. More specifically, the command response unit 110 is the component that actually receives the immediate-response message.

Having received the necessary immediate-response message, the command response unit 110 in step 512 routes the message to an appropriate one of the ELFs 104, preferably the same ELF that initiated action in step 506. Then, in step 513, this ELF takes appropriate action (if any) in response to the immediate-response message. Next, step 514 asks whether the message sent in step 508 is the type where a delayed-response message is expected. If not, the ELF receiving the immediate-response message in step 512 takes appropriate action (if any) in step 520.

If step 514 expects a delayed-response message, however, step 516 waits until the expected delayed-response message is actually received. Then, after step 516, the message console 112 in step 518 routes the delayed-response message to an appropriate one of the ELFs 104. This routing is performed based on the content of the message. Following step 518, the ELF receiving the message takes appropriate action in step 520. Step 520 may involve doing nothing, performing a computation, invoking another process, or any other appropriate action in step 520. Furthermore, step 520 may involve generating another message, in which case, control is effectively returned to step 506.

After step 520, control returns to step 504, where the routine 500 starts over.

Implementation Details

As mentioned above, the preferred application of the invention implements the system 100 as an automated system administrator, in substitution for a human storage administrator, in a mass storage subsystem. The operation of the routine 500 in this particular environment is further embellished with the following description. Without any limitation thereby, the examples below are explained in the context of the data storage subsystem 300 of FIG. 3.

Received Messages

As one particular application, the data storage subsystem 102 may be provided by the storage interface 304 and the automated tape library 308, as mentioned above. In this example, the messages received by the SANTA 106 comprise ASCII messages normally sent by an IBM model 3494 B16 Virtual Tape Server (the storage interface 304) or an IBM model 3494 Tape Library (the tape library 308) to a human system administrator. Some examples of these messages are shown in Table 1, where "NNNN" represents a numerical code

TABLE 1

ANSNNNN STORAGE POOL UPDATED
BACKGROUND PROCESS NNNN STARTED
BACKGROUND PROCESS NNNN FAILED
BACKGROUND PROCESS NNNN SUCCEEDED
ANSNNNN DEVICE CLASS UPDATED

Exemplary Sequences

To further explain the operation of the system 100 in a mass storage system, a number of ELFs and their operation are discussed as follows.

Reclamation

As an example, one or more ELFs may be implemented to perform a "reclamation" function, which consolidates data by removing valid data from a specified tape and copying the data to another tape, leaving only expired data on the original tape. In this embodiment, the ELF 116 in step 504 detects a stimulus comprising a message from the timer 124. This stimulus is received on the input 116*a* of the ELF 116. In this example, the timer 124 issues a "ENABLE RECLAMATION" message.

In response to the stimulus, the ELF 116 in step 506 generates an output message such as "UPDATE STORAGE POOL RECLAMATION=90%". The command generator 108 sends the message to the storage controller 310 in step 508. Then, in step 510, the SANTA 106 receives an immediate-response message from the storage controller 310. In this example, the immediate-response message may be "ANSNNNN STORAGE POOL UPDATED", where "NNNN" refers to a message message number from the data storage subsystem 300. This being an immediate-response message, the command response unit 110 in step 512 routes the received message to the appropriate ELF, preferably the same ELF 116 that originated the procedure in step 506.

Following step 512, the ELF 116 in step 513 recognizes that no further action is required, and does nothing. Then, in step 514 the ELF 116 recognizes that a delayed-response message is also not expected in this case, and routes control to step 520. In step 520, the ELF recognizes that the storage pool has been updated as requested, and takes no action. In this case, "no action" is the appropriate action, since the task has completed successfully.

Check-In

In another example, one or more ELFs may be implemented to perform a media volume check-in function, which receives a new tape into the library 308. In this embodiment, the ELF 116 in step 504 detects a stimulus comprising a message from an external source 126, which in this case is another ELF. This stimulus is received on input 116*b* of the ELF. In this example, the source 126 issues a "CHECK-IN LIBRARY VOLUME NNNN AS SCRATCH" message, which asks the system 100 to introduce a new volume of media into the data storage subsystem 300.

In response to the stimulus, the ELF 116 in step 506 generates an output message such as "CHECK-IN LIBRARY VOLUME IN LIBRARY-NAME, CARTRIDGE TYPE=3590, ACCESS=SCRATCH". This instructs the subsystem 300 that the new volume is an IBM model 3590 type tape, and is considered a "scratch" category volume. The command generator 108 sends the message to the storage controller 310 in step 508. Next, in step 510, the SANTA 106 receives an immediate-response message from the storage controller 310. In this example, the immediate-response message may be "BACKGROUND PROCESS NNNN STARTED", where "NNNN" is an identifier for the check-in process initiated in the subsystem 300. This being an immediate-response message, the command response unit 110 in step 512 routes the received message to the appropriate ELF, preferably the same ELF 116 that originated the procedure in step 506.

Following step 512, the ELF 116 in step 513 recognizes that no action is needed in response to the immediate-response message. Accordingly the ELF 116 proceeds to step 514. Recognizing that a delayed-response message is proper in this case, the ELF 116 routes control to step 516. Step 516 waits until the delayed-response message is received from the storage controller 310. This message may comprise a "BACKGROUND PROCESS NNNN SUCCEEDED" or "BACKGROUND PROCESS NNNN FAILED" message. Having received the delayed-response message, the message console 112 forwards the message to the appropriate ELF, preferably the ELF 116 that acted in step 506. In response, the ELF 116 in step 520 takes appropriate action, such as sending a completion notification message to the ELF that originated the check-in process in step 504.

Cartridge ID

In another example, one or more ELFs may be implemented to perform a cartridge-ID function, which identifies a tape cartridge with a specified identification (ID) code. In this embodiment, the ELF 116 in step 504 detects a stimulus comprising a message from an external source 126. This stimulus is received on the input 116*b* of the ELF 116. In this example, the external source 126 comprises another ELF or the library manager 314, which issues a "WHAT PHYSICAL CARTRIDGE IS EXTERNAL OBJECT ID NNNN?" message, asking the system 100 to identify a cartridge with a particular ID code.

In response to the stimulus, the ELF 116 in step 506 generates an output message such as "QUERY VOLUME USAGE EXTERNAL OBJECT ID=NNNN". This queries the subsystem 300 to determine the cartridge's ID. The command generator 108 sends the message to the storage controller 310 in step 508. In response, the storage controller 310 may, for example, consult the catalog 328 to determine the requested cartridge. Next, in step 510, the SANTA 106 receives an immediate-response message from the storage controller 310. In this example, the immediate-response message may be "OBJECT ID=ABCNNN", specifying the cartridge's label. This being an immediate-response message, the command response unit 110 in step 512 routes the received message to the appropriate ELF, preferably the same ELF 116 that acted in step 506.

Following step 512, the ELF 116 in step 513 takes no action, since none is required by the immediate-response message. In step 514, the ELF 116 recognizes that a delayed-response message is not expected in this case, and routes control to step 520. In step 520, the ELF 116 recognizes that the cartridge ID has been supplied as requested, and takes appropriate action by forwarding the cartridge ID to the originating ELF or library manager 314.

Tape Insert Processing

Figure 6:
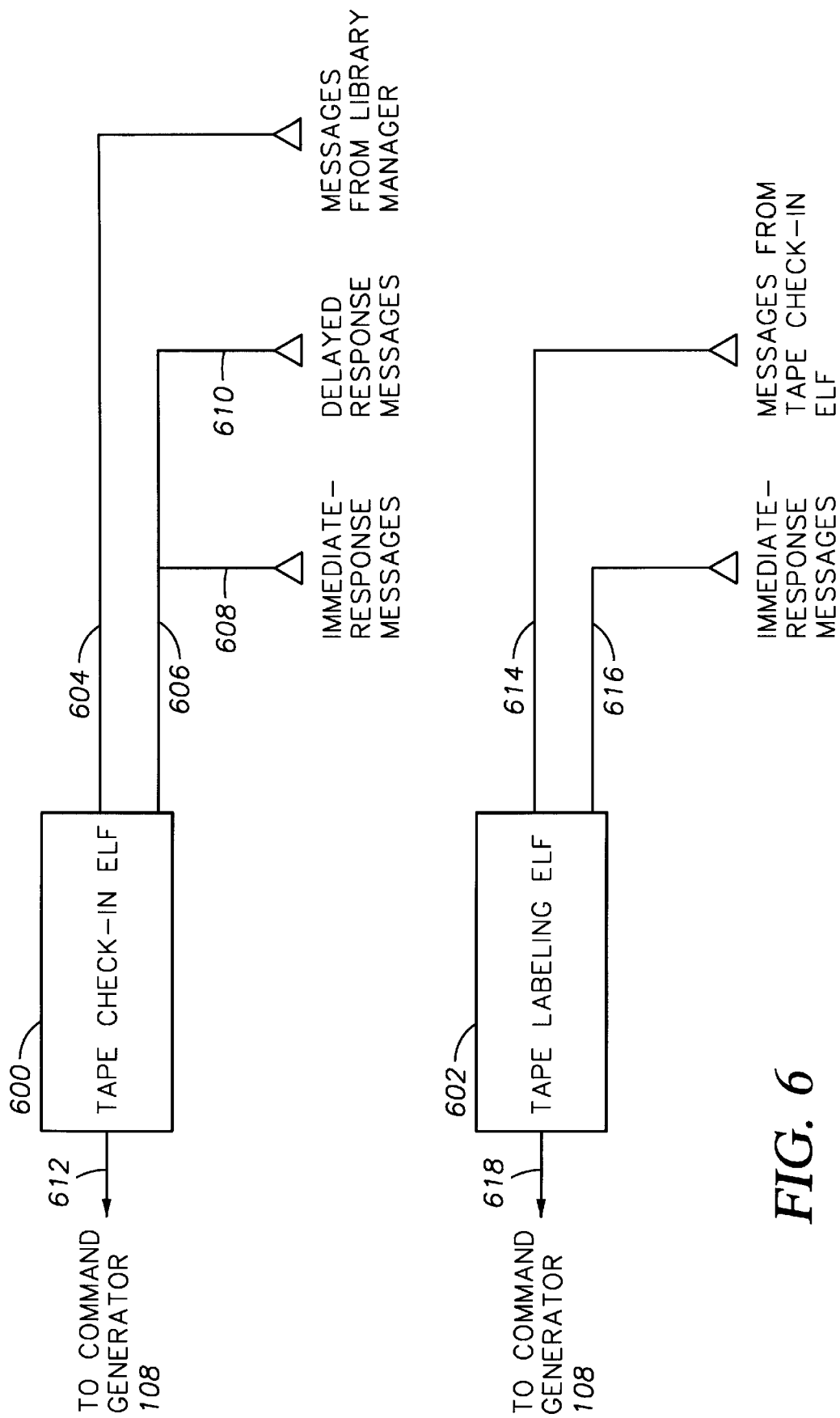
FIG. 6 is a block diagram illustrating a pair of specialized ELFs for tape insert processing according to the invention.

As still another example, one or more ELFs may be implemented to assist with the introduction ("insertion") of items of data storage media into the library 308. This function may be implemented using multiple ELFs, where each ELF contributes toward the overall job, or alternatively by using a single ELF. For ease of explanation, the illustrated example employs multiple ELFs, including a tape check-in ELF 600 and a tape labeling ELF 602, as shown in FIG. 6.

A. Specialized ELFs

The tape check-in ELF 600 includes a first input 604 and a second input 606. Contrasted with the second input 606, the first input 604 receives stimuli messages that spark initial action on the part of the ELF 600. This input 604 receives messages from the library manager 314. In the illustrated embodiment, the library manager 314 is directly coupled to the input 604, and constitutes an "external source". Thus, messages from the library manager 314 proceed directly to the stimulus input 604. In an alternative arrangement, the library manager 314 may direct its stimuli messages to the ELF 600 via the SANTA 106, ultimately arriving at the input 604. Immediate-response and delayed-response messages are received on the lines 608, 610, which are coupled to the input 606.

The tape labeling ELF 602 includes a first input 614 and a second input 616. As in the tape check-in ELF 600, the first input 614 receives stimuli messages that spark initial action on the part of the ELF 600. Preferably, the tape check-in ELF 600 is directly coupled to the input 614 of the tape labeling ELF 602. Thus, stimuli ELF 600 may proceed directly to the ELF 602. Alternatively, these messages may arrive via the SANTA 106, coupled to the input 614. Immediate-response messages are received on the input 616. With the illustrated configuration of the tape labeling ELF 602, delayed-response messages are not expected.

B. Introduction to Sequence 700

Figure 7A:
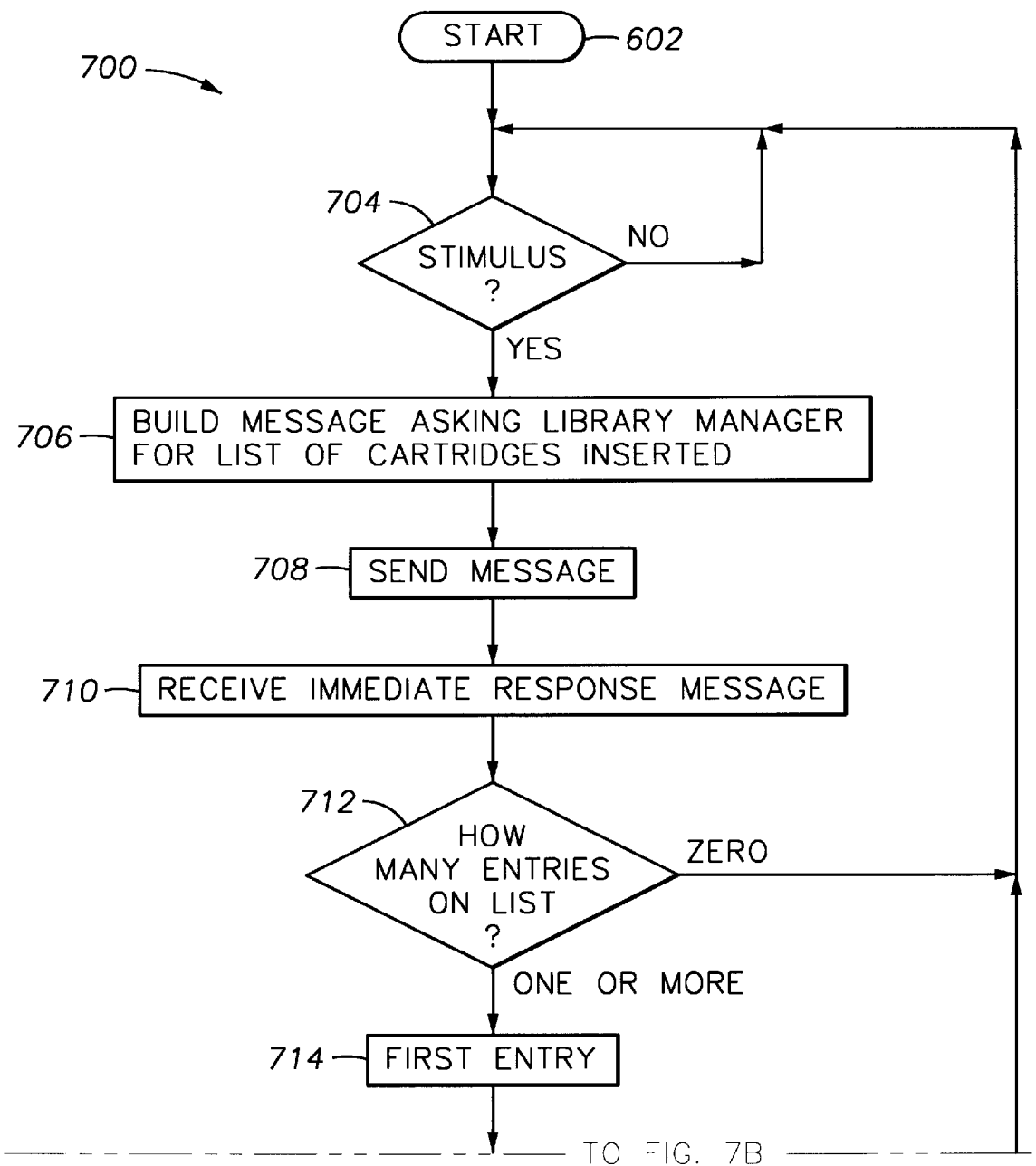
FIGS. 7A–7B are a specific example of a flowchart depicting an illustrative operational sequence for tape insert processing according to a specific example of the invention.
Figure 7B:
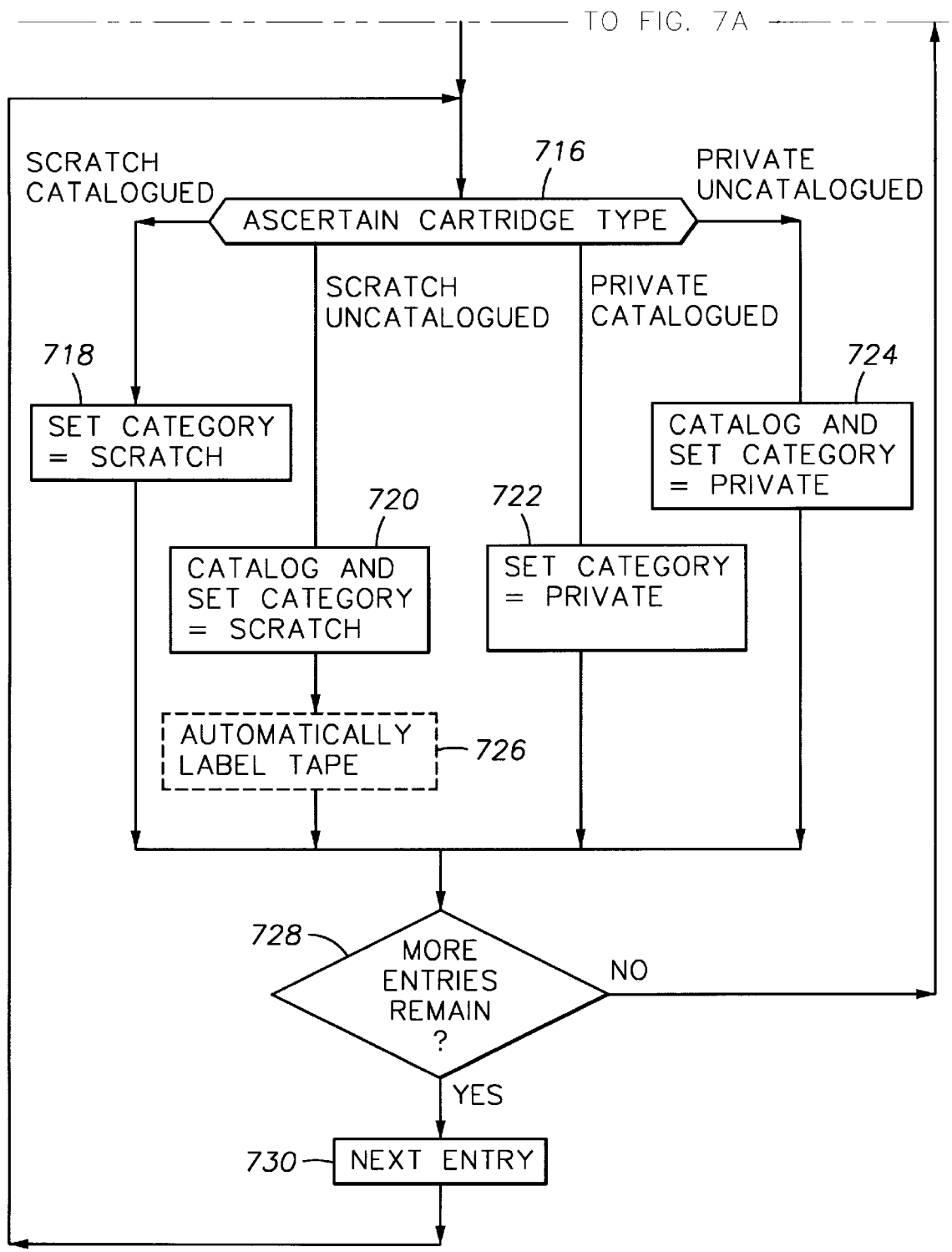

The presently described tape insertion processing function is carried out using the general model illustrated by the sequence 500 (FIG. 5). However, tape insertion processing involves many different messages, and thus multiple passes through the routine 500. Therefore, a more comprehensive explanation is made using FIGS. 7A–7B, which illustrate a routine 700, involving multiple passes through the sequence 500. To fully explain the features of the routine 700, the following description to the automated message processing system 100 (FIG. 1), the data storage subsystem 300 (FIG. 3), and the ELFs 600–602 (FIG. 6) as an example, although other systems (not shown) may be used instead.

C. Stimulus

After the routine 700 begins in step 702, the tape check-in ELF 600 in step 704 detects a stimulus. In the particular arrangement shown in the example of FIGS. 3 and 6, the stimulus arises when the library manager 314 detects insertion of a cartridge at the input facility 316. When this occurs, the library manager 314 generates a stimulus message and forwards it to the tape check-in ELF 600. As mentioned above, the message may be delivered to the ELF 600 directly or via the SANTA 106. In this example, the stimulus comprises a message alerting the ELF 600 to the insertion of tape cartridge into the input facility 316.

D. Obtain List of Cartridges

After step 704, the ELF 600 in step 706 generates an output message asking the library manager 314 for a list of the cartridges inserted into the input facility 316. In step 708, the command generator 108 formats and sends the message to the library manager 314. Next, in step 710 the command response unit 110 receives an immediate-response message sent by the library manager 314; this message includes the requested list. Also in step 710, the command response unit 110 routes this message to the tape check-in ELF 600.

E. Ascertain Cartridge Type

Recognizing that no delayed-response message is expected, the drive availability ELF 600 proceeds to take appropriate action in step 712. Namely, if the list is empty, control returns to step 704. However, if the list contains one or more tape cartridges, the ELF 600 selects the first entry in step 714, and then proceeds to process that entry. At this point, the first entry is the "current" entry, referring to the fact that this entry is presently being processed. Processing of the "current" cartridge begins in step 716, which ascertains the current cartridge's "type".

In the present example, cartridge "types" are either "insert", "scratch", or "private", and either "catalogued" or "uncatalogued". Cartridges newly inserted into the library 308 via the input facility 316 are "insert" category cartridges. A "scratch" type cartridge contains no valid data; it is either empty, or contains discarded data. A "private" type cartridge contains data recognized as being valid. A "catalogued" cartridge is listed in the catalog 328, whereas "uncatalogued" cartridges are not.

The ELF 600 may perform step 716 in a number of different ways. For example, the ELF 600 may issue a message requesting the storage controller 310 to determine the cartridge's type by constituting the catalog 328 or other available records. Alternatively, as described below, the ELF 600 may issue a message attempting to blindly catalog the cartridge and set its type, and reattempting with different combinations in response to any error messages returned by the storage controller 310.

F. Categorize and Catalog

After ascertaining the cartridge type, step 716 proceeds to an appropriate one of steps 718–724. If the current tape cartridge is a catalogued scratch cartridge, the ELF 600 in step 718 sets the category to "scratch". No cataloguing is needed. If the first entry's tape cartridge is an uncatalogued scratch cartridge, the ELF 600 in step 720 catalogs the cartridge and sets is category to "scratch". If the first entry's tape cartridge is a catalogued private cartridge, the ELF 600 in step 722 sets the category to "private". No cataloguing is needed in this case. If the first entry's tape cartridge is an uncatalogued private cartridge, the ELF 600 in step 724 catalogs the cartridge and sets is category to "private".

As an optional measure, after step 720 the tape labeling ELF 602 may proceed to automatically label the cartridge (step 726). "Labeling" the tape cartridge involves storing the cartridge ID (or some other identification code linked to a printed label externally attached to the cartridge) onto the tape media, preferably in a header near the beginning of the tape. Labeling of the tape involves writing the cartridge identifier on the outside of the cartridge (or some ID lined to the external label) onto the media in a "header" at the front of the tape. Labeling is appropriate after step 720, as this step involves uncatalogued scratch type cartridges. With catalogued cartridges or private cartridges, labeling is inappropriate because the cartridge has presumably already been labeled when the cartridge was first catalogued (in the case of a catalogued cartridge) or when the cartridge first received data (in the case of a private cartridge).

G. Labeling

Preferably, the tape labeling ELF 602 performs step 726 in accordance with the general routine 500, described above. In particular, the ELF 602 first receives a stimulus from the tape check-in ELF 600, signalling the need to label a tape cartridge (step 504). In response, the ELF 602 generates an output message directing one of the tape drives 326 to store the appropriate label to the tape media. The command generator 108 formats and dispatches this message to one of the tape drives 326. After the tape drive 326 receives the message and stores the label on the tape, the tape drive 326 seeks an immediate-response message confirming completion of the label (step 510). The command response unit 110 routes the immediate-response message to the response input 616 of the tape labeling ELF 602 (step 512). As no delayed-response message is expected (step 514), the ELF 602 takes appropriate action (step 520). In this case, the appropriate action is "no action", since the label has been completed as requested, finishing the process of step 726.

H. Final Steps

After any of steps 718, 726 (or 720), 722, or 724, step 728 asks whether any more entries remain in the list of new cartridges previously obtained in step 710. If not, control returns to step 704. If more cartridges remain, however, the next cartridge on the list is selected in step 730, making this tape cartridge the "current" entry. Control then returns to step 716 to examine and process the current cartridge.

I. Alternative Sequence for Ascertaining Cartridge Type

As mentioned above, the ELF 600 may issue a message attempting to blindly catalog the current cartridge and set its type, reattempting with different combinations in response to any error messages returned by the storage controller 310.

Figure 8:
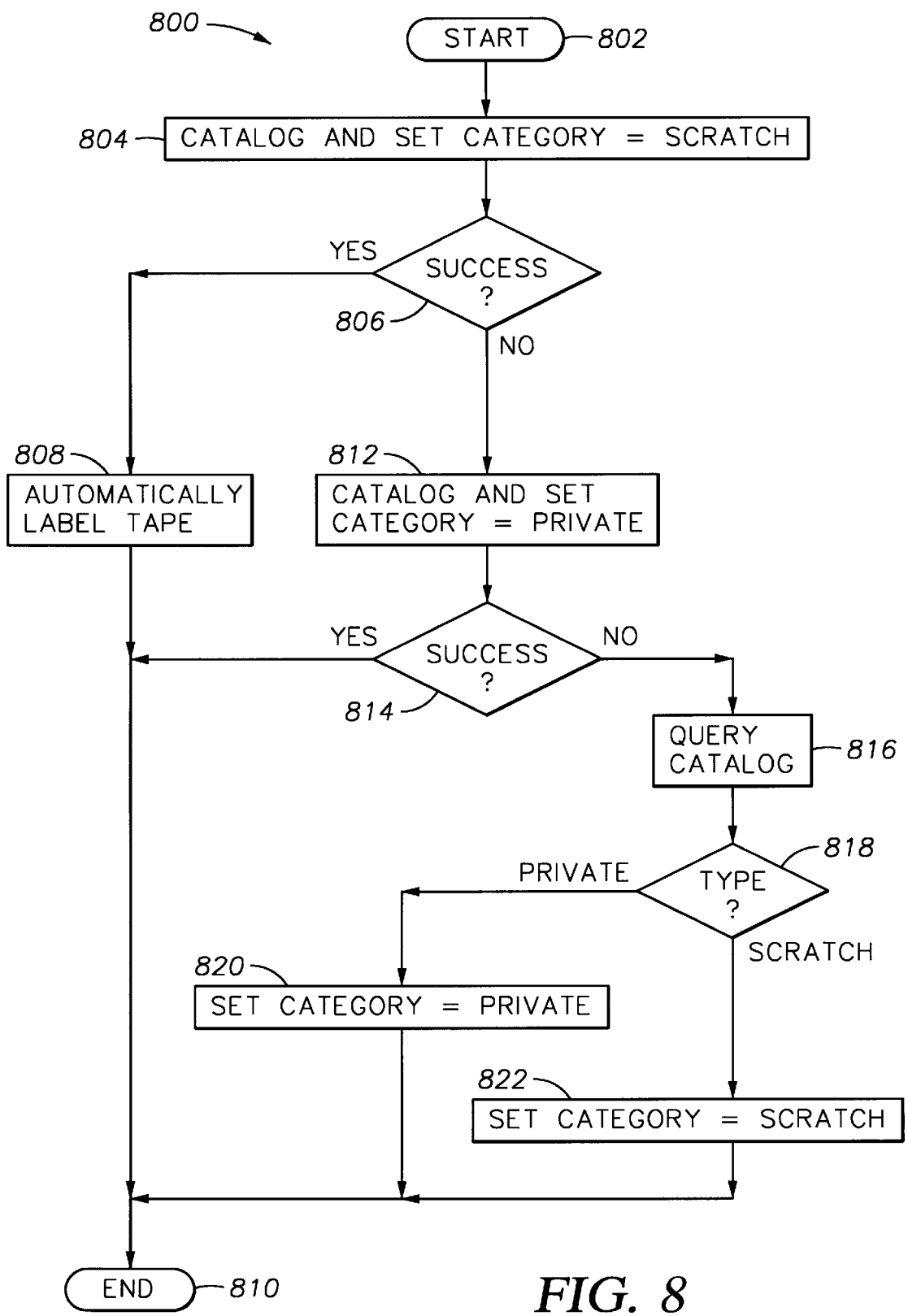
FIG. 8 is a flowchart depicting an alternative operational sequence for ascertaining cartridge type according to the invention.

This process is more specifically illustrated by the routine 800 (FIG. 8), which is performed as an alternative to steps 716–726 of FIG. 7. Initially, the current cartridge is an "insert" type cartridge, having been introduced into the library 308 via the input facility 316.

After the routine 800 begins in step 802, step 804 attempts to enter the current tape cartridge in the catalog 328, and also attempts to change its category from "insert" to "scratch". In the illustrated example, each tape cartridge's category is logged in the catalog 328, as well as a category list 390 contained in the library 308. Step 804 may be performed, for example, by the tape check-in ELF 600 generating a message directing the storage controller 310 to catalog the cartridge as a "scratch" category cartridge.

After step 804, step 806 determines whether step 804 was successful. Success may be indicated, for example, by a confirmation message from the storage controller 310. If so, step 808 labels the current cartridge, which may be performed as discussed above in step 726 (FIG. 7). After step 808, the routine 800 ends in step 810, whereupon control returns to step 728 (FIG. 7).

If step 806 encounters an error, however, step 808 is not performed. An error may result, for example, if the cartridge is already catalogued as a scratch cartridge, it is already catalogued as a private cartridge, or it is uncatalogued but listed in the category list 390 as a private category cartridge. In the illustrated system, however, the error message does not indicate the reason for the error. Therefore, step 812 is performed, attempting to enter the cartridge in the catalog 328 as a "private" category cartridge. After step 812, step 814 determines whether the attempt of step 812 succeeded. If so, the routine 800 ends in step 810.

Step 812 may result in another error message, however. This error may result because the cartridge is already catalogued as a private cartridge, or it is already catalogued as a scratch cartridge. Under these circumstances, the cartridge is apparently not uncatalogued, since an uncatalogued cartridge would have been successfully catalogued in steps 812 or 804. Therefore, the error is occurring because the cartridge is already catalogued. Thus, if step 806 indicates an error, control proceeds to step 816, which queries the catalog 328 to determine how the cartridge is entered in the catalog 328.

If the catalog 328 indicates that the cartridge is already catalogued as a "private" catalog, step 820 updates the category list 390 to show the cartridge as "private". If the catalog 328 lists the cartridge as a "scratch" category cartridge, step 822 sets the cartridge's category to "scratch" in the category list 390. After steps 820 or 822, the routine 800 ends in step 810.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. A method of receiving units of removable data storage media into a data storage subsystem comprising:
   a library including:
      multiple data storage media units;
      multiple storage drives to removably receive and access the data storage media units;
      a library manager coupled to the storage controller and the storage drives;
      an input facility to receive media units into the library; and
   a storage controller coupled to the library;
   a machine-readable media directory accessible by at least one of the storage controller and the library manager, the media directory including information associating one or more of the media units with predetermined first and second categories;
   an automated storage administrator coupled to the library manager and the storage controller;
said method comprising:
   the automated storage administrator repeatedly sending requests to the data storage subsystem to enter a first media unit into the media directory under different categories;
   the automated storage administrator ceasing the repeated sending or requests when a first one of the following occurs: requests have been sent to the subsystem under a predetermined number of categories, or the first media unit is successfully entered in the media directory;
   if requests have been sent to the subsystem under a predetermined number of categories without successfully entering the first media unit into the media directory, the automated storage administrator sending a request to the catalog to obtain information stored therein representing the first media unit;
   the subsystem sending the requested information, and in response, the automated storage administrator sending a request to the media directory to enter data including at least some of the requested information representative of the first media unit.

2. The method of claim 1, wherein the first predetermined category represents media units containing data recognized by the subsystem.

3. The method of claim 1, wherein the second predetermined category represents media units not containing data recognized by the subsystem.

4. The method of claim 1, the media units comprising tape media units and the drives comprising tape drives.

5. A method of receiving units of removable data storage media into a data storage subsystem comprising:
   a library including:
      multiple data storage media units;
      multiple storage drives to removably receive and access the data storage media units;
      a library manager coupled to the storage controller and the storage drives;
      an input facility to receive media units into the library; and
   a storage controller coupled to the library;
   a media directory, comprising:
      a machine-readable catalog accessible by the storage controller;
      a machine-readable category list accessible by at least one of the storage controller and the library manager;
      each of the catalog and category list associating one or more of the media units with first and second predetermined categories;
   an automated storage administrator coupled to the library manager and the storage controller;
said method comprising:
   the automated storage administrator sending a first request to the data storage subsystem to enter a first media unit into the catalog under the first category;

if the media unit is already entered in the catalog, or entered in the category list under the second category, the subsystem responding to the first request by issuing a first error message to the automated storage administrator;

in response to first error message, the automated storage administrator sending a second request to the subsystem to enter the first media unit into the catalog under the second category;

if the media unit is already entered in the catalog, the subsystem responding to the second request by issuing a second error message to the automated storage administrator;

in response to the second error message, the automated storage administrator sending a third request to the subsystem to query the catalog to identify a category associated with the first media unit;

in response to the third request, the subsystem sending an advisory message indicating the category associated with the first media unit; and in response to the advisory message, the automated storage administrator sending the subsystem a fourth request to enter the first media unit in the category list under the category indicated by the advisory message.

6. The method of claim 5, the category list being contained in the library.

7. The method of claim 5, the first predetermined category representing media units containing recognized data.

8. The method of claim 5, the second predetermined category representing media units not containing recognized data.

9. The method of claim 5, the media units comprising tape media units and the drives comprising tape drives.

10. A method of receiving units of removable data storage media into a data storage subsystem that includes:

a storage controller;

a library including:
multiple data storage media units;
multiple storage drives to removably receive and access the data storage media units;
a library manager coupled to the storage controller and the storage drives;
an input facility to receive media units into the library; and
a machine-readable classification database accessible by at least one of the storage controller and the library manager, containing classification information for media units in the library;

an automated storage administrator coupled to the library manager and the storage controller, said automated storage administrator including:
a plurality of expert local facilities (ELFs) each ELF performing predetermined actions responsive to each message routed thereto, said ELFs including a media check-in ELF;
a message director to receive input messages from the storage controller and library manager and route each of the received input messages to one or more ELFs;
a command generator to receive output messages from the ELFs, place the output messages into a predetermined format, and dispatch the formatted output messages to a destination including at least one of the storage controller and the library manager;

wherein said method of receiving units of removable data storage media comprises:

the automated storage administrator receiving a first message signalling insertion of one or more media units into the input facility;

the message director routing the first message to the media check-in ELF;

the media check-in ELF, in response to the first message, performing the predetermined actions associated with the media check-in ELF, said predetermined actions including generating a second message requesting a list of media units inserted into the input facility;

the command generator modifying the second message into a predetermined format to create a formatted second message;

the command generator dispatching the formatted second message to the library manager;

the automated storage administrator receiving a third message from the library manager listing the media units inserted into the input facility;

the message director routing the third message to the media check-in ELF;

in response to the third message, for each individual media unit contained in the list:

the media check-in ELF generating a fourth message requesting classification information for the media unit;

the command generator modifying the fourth message into a predetermined format to create a formatted fourth message;

the command generator dispatching the formatted fourth message to the storage subsystem;

the storage subsystem consulting the classification database to obtain the requested classification information, and then sending a fifth message representative of the requested classification information;

the automated storage administrator receiving the fifth message;

the message director routing the fifth message to the media check-in ELF;

the media check-in ELF, in response to the fifth message, generating at least a sixth message to record information representative of the media unit in the classification database;

modifying each further message into a predetermined format to create a corresponding number of a formatted further messages; and dispatching each formatted further message to the data storage subsystem.

11. The method of claim 10, the classification database including a machine-readable catalog accessible by at least one of the library manager and the storage controller, the sixth message comprising a message requesting recording of a representation of the media unit in the catalog.

12. The method of claim 10, the classification database including a machine-readable category list accessible by at least one of the library manager and the storage controller, the sixth message comprising a message requesting recording of a representation of the media unit in the category list.

13. The method of claim 10, the classification database associating one or more of the media units with one of a predetermined number of predetermined media unit classifications.

14. The method of claim 13, the predetermined media unit classifications including (1) a first classification representing media units containing data, and (2) a second classification representing media units not containing data.

15. The method of claim 13, the data storage subsystem including a catalog accessible by at least one of the library manager and the storage controller, the predetermined media unit classifications including (1) a first classification representing media units listed in the catalog, and (2) a second classification representing media units not listed in the catalog.

16. The method of claim 10, the ELFs further including a labeling ELF having a predetermined labeling process associated therewith, the method further including a process for labeling a media unit, comprising:

the media check-in ELF, in response to the fifth message, applying the process associated with the media check-in ELF to generate a seventh predetermined message advising the labeling ELF of the classification information represented in the fifth message;

the message director modifying the seventh message into a predetermined format to create a formatted seventh message;

the message director dispatching the formatted seventh message to the labeling ELF;

in response to the formatted seventh message, the labeling ELF applying the labeling process to generate an eighth message instructing one of the tape drives to store information on the media unit representative of its associated classification information;

the message director modifying the eight message into a predetermined format to create a formatted eighth message; and the message director dispatching the formatted eight message to the library.

17. The method of claim 10, the media units comprising data storage tape cartridges.

18. A programmed product comprising signal-bearing media tangibly embodying a program of machine-readable instructions executable by a digital processing apparatus to perform a method for receiving units of removable data storage media into a data storage subsystem that comprises:

a library including:
      multiple data storage media units;
      multiple storage drives to removably receive and access the data storage media units;
      a library manager coupled to the storage controller and the storage drives;
      an input facility to receive media units into the library; and
   a storage controller coupled to the library;
   a media directory, accessible by at least one of the storage controller and the library manager, the media directory including information associating one or more of the media units with predetermined first and second categories;
   an automated storage administrator coupled to the library manager and the storage controller;
   said method for receiving units of removable data storage media comprising:
      the automated storage administrator repeatedly sending requests to the media directory to enter a first media unit into the media directory under different categories;
      the automated storage administrator ceasing the repeated sending of requests when a first one of the following occurs: requests have been sent to the media directory under a predetermined number of categories, or the first media unit is successfully entered in the media directory;
      if requests have been sent to the media directory under a predetermined number of categories without successfully entering the first media unit into the media directory, the automated storage administrator sending a request to the catalog to obtain information stored therein representing the first media unit;
      the automated storage administrator receiving the requested information, and in response, sending a request to the media directory to enter data including at least some of the requested information representative of the first media unit.

19. The product of claim 18, wherein the first predetermined category represents media units containing data recognized by the subsystem.

20. The product of claim 18, wherein the second predetermined category represents media units not containing data recognized by the subsystem.

21. The product of claim 18, the media units comprising tape media units and the drives comprising tape drives.

22. A programmed product comprising signal-bearing media tangibly embodying a program of machine-readable instructions executable by a digital processing apparatus to perform a method for receiving units of removable data storage media into a data storage subsystem that comprises:

a library including:
      multiple data storage media units;
      multiple storage drives to removably receive and access the data storage media units;
      a library manager coupled to the storage controller and the storage drives;
      an input facility to receive media units into the library; and
   a storage controller coupled to the library;
   a media directory, comprising:
      a machine-readable catalog accessible by the storage controller;
      a machine-readable category list accessible by at least one of the storage controller and the library manager;
      each of the catalog and category list associating one or more of the media units with first and second predetermined categories;
   an automated storage administrator coupled to the library manager and the storage controller;
   said method for receiving units of removable data storage media comprising:
      the automated storage administrator sending a first request to the media directory to enter a first media unit into the catalog under the first category;
      if the media unit is already entered in the catalog, or entered in the category list under the second category, the storage controller responding to the first request by issuing a first error message to the automated storage administrator;
      in response to first error message, the automated storage administrator sending a second request to the media directory to enter the first media unit into the catalog under the second category;
      if the media unit is already entered in the catalog, the storage controller responding to the second request by issuing a second error message to the automated storage administrator;
      in response to the second error message, the automated storage administrator sending a third request to the media directory to query the catalog to identify the category associated with the first media unit;

in response to the third request, the subsystem sending an advisory message indicating the category associated with the first media unit; and in response to the advisory message, the automated storage administrator sending the media directory a fourth request to enter the first media unit in the category list under the category indicated by the advisory message.

23. The product of claim 22, the category list being contained in the library.

24. The product of claim 22, the first predetermined category representing media units containing recognized data.

25. The product of claim 22, the second predetermined category representing media units not containing recognized data.

26. The product of claim 22, the media units comprising tape media units and the drives comprising tape drives.

27. A programmed product comprising signal-bearing media tangibly embodying a program of machine-readable instructions executable by a digital processing apparatus to perform a method for receiving units of removable data storage media into a data storage subsystem that comprises:

a storage controller;

a library including:
multiple data storage media units;
multiple storage drives to removably receive and access the data storage media units;
a library manager coupled to the storage controller and the storage drives;
an input facility to receive media units into the library; and a machine-readable classification database accessible by at least one of the storage controller and the library manager, containing classification information for media units in the library;

an automated storage administrator coupled to the library manager and the storage controller, said automated storage administrator including:
a plurality of expert local facilities (ELFs) each ELF performing predetermined actions responsive to each message routed thereto, said ELFs including a media check-in ELF;
a message director to receive input messages from the storage controller and library manager and route each of the received input messages to one or more ELFs;
a command generator to receive output messages from the ELFs, place the output messages into a predetermined format, and dispatch the formatted output messages to a destination including at least one of the storage controller and the library manager;

wherein said method of receiving units of removable data storage media comprises:
the automated storage administrator receiving a first message signalling insertion of one or more media units into the input facility;
the message director routing the first message to the media check-in ELF;
the media check-in ELF, in response to the first message, performing the predetermined actions associated with the media check-in ELF, said predetermined actions including generating a second message requesting a list of media units inserted into the input facility;
the command generator modifying the second message into a predetermined format to create a formatted second message;
the command generator dispatching the formatted second message to the library manager;
the automated storage administrator receiving a third message from the library manager listing the media units inserted into the input facility;
the message director routing the third message to the media check-in ELF;
in response to the third message, for each individual media unit contained in the list:
the media check-in ELF generating a fourth message requesting classification information for the media unit;
the command generator modifying the fourth message into a predetermined format to create a formatted fourth message;
the command generator dispatching the formatted fourth message to the storage controller;
the storage controller consulting the classification database to obtain the requested classification information, and then sending a fifth message representative of the requested classification information;
the automated storage administrator receiving the fifth message;
the message director routing the fifth message to the media check-in ELF;
the media check-in ELF, in response to the fifth message, generating at least one further message to record information representative of the media unit in the classification database;
modifying each further message into a predetermined format to create a corresponding number of formatted further messages; and
dispatching each formatted further message to the classification database.

28. The product of claim 27, the classification database including a machine-readable catalog accessible by at least one of the library manager and the storage controller, the sixth message comprising a message requesting recording of a representation of the media unit in the catalog.

29. The product of claim 27, the classification database including a machine-readable category list accessible by at least one of the library manager and the storage controller, the sixth message comprising a message requesting recording of a representation of the media unit in the category list.

30. The product of claim 27, the classification database associating one or more of the media units with one of a predetermined number of predetermined media unit classifications.

31. The product of claim 27, the ELFs further including a labeling ELF having a predetermined labeling process associated therewith, the product further including a process for labeling a media unit, comprising:
the media check-in ELF, in response to the fifth message, applying the labeling process to generate a seventh predetermined message advising the labeling ELF of the classification information represented in the fifth message;
the message director modifying the seventh message into a predetermined format to create a formatted seventh message;
the message director dispatching the formatted seventh message to the labeling ELF;
in response to the formatted seventh message, the labeling ELF generating an eighth message instructing one of the tape drives to store information on the media unit representative of its associated classification information;

the message director modifying the eight message into a predetermined format to create a formatted eighth message; and the message director dispatching the formatted eight message to the library.

32. The product of claim 27, the predetermined classifications of media units including (1) a first classification representing media units containing data, and (2) a second classification representing media units not containing data.

33. The product of claim 27, the data storage subsystem including a catalog accessible by at least one of the library manager and the storage controller, the predetermined classifications of media units including (1) a first classification representing media units listed in the catalog, and (2) a second classification representing media units not listed in the catalog.

34. The product of claim 27, the media units comprising data storage tape cartridges.

35. A data storage subsystem, comprising:
a library including:
multiple data storage media units;
multiple storage drives to removably receive and access the data storage media units;
a library manager coupled to the storage controller and the storage drives;
an input facility to receive media units into the library; and
a storage controller coupled to the library;
a media directory, accessible by at least one of the storage controller and the library manager, the media directory including information associating one or more of the media units with predetermined first and second categories;
an automated storage administrator coupled to the library manager and storage controller, the automated storage administrator being programmed to receive data storage media units into the subsystem by:
repeatedly sending requests to the media directory to enter the first media unit into the media directory under different categories;
ceasing the repeated sending of requests when a first one of the following occurs: requests have been sent to the directory under a predetermined number of categories, or the first media unit is successfully entered in the media directory;
if requests have been sent to the media directory under a predetermined number of categories without successfully entering the first media unit into the media directory, sending a request to the catalog to obtain information stored therein representing the first media unit;
receiving the requested information from the directory, and in response, sending a request to media directory to enter data including at least some of the requested information representative of the first media unit.

36. The subsystem of claim 35, wherein the first predetermined category represents media units containing data recognized by the subsystem.

37. The subsystem of claim 35, wherein the second predetermined category represents media units not containing data recognized by the subsystem.

38. The subsystem of claim 35, the media units comprising tape media units and the drives comprising tape drives.

39. The subsystem of claim 35, the category list being contained in the library.

40. The subsystem of claim 35, the first predetermined category representing media units containing recognized data.

41. The subsystem of claim 35, the second predetermined category representing media units not containing recognized data.

42. The subsystem of claim 35, the media units comprising tape media units and the drives comprising tape drives.

43. A data storage subsystem, comprising:
a library including:
multiple data storage media units;
multiple storage drives to removably receive and access the data storage media units;
a library manager coupled to the storage controller and the storage drives;
an input facility to receive media units into the library; and
a storage controller coupled to the library;
a media directory, including:
a machine-readable catalog accessible by the storage controller; and
a machine-readable category list accessible by at least one of the storage controller and the library manager;
each of the catalog and category list associating one or more of the media units with first and second predetermined categories;
an automated storage administrator coupled to the library manager and the storage controller, programmed to receive units of removable data storage media by:
sending a first request to the media directory to enter a first media unit into the catalog under the first category;
if the media unit is already entered in the catalog, or entered in the category list under the second category, receiving a first error message from the media directory;
in response to first error message, sending a second request to the media directory to enter the first media unit into the catalog under the second category;
if the media unit is already entered in the catalog, receiving a second error message from the media directory;
in response to the second error message, sending a third request to the media directory to query the catalog to identify a category associated with the first media unit;
receiving an advisory message sent by the media directory in response to the third request, the advisory message indicating the category associated with the first media unit; and
in response to the advisory message, sending the media directory a fourth request to enter the first media unit in the category list under the category indicated by the advisory message.

44. A data storage subsystem, comprising:
a storage controller;
a library including:
multiple data storage media units;
multiple storage drives to removably receive and access the data storage media units;
a library manager coupled to the storage controller and the storage drives;
an input facility to receive media units into the library; and
a machine-readable classification database accessible by at least one of the storage controller and the library manager, containing classification information for media units in the library;
an automated storage administrator coupled to the library manager and the storage controller, and comprising:

a plurality of expert local facilities (ELFs) each ELF performing predetermined actions responsive to each message routed thereto, said ELFs including a media check-in ELF;

a message director to receive input messages from the storage controller and library manager and route each of the received input messages to one or more ELFs;

a command generator to receive output messages from the ELFs, place the output messages into a predetermined format, and dispatch the formatted output messages to a destination including at least one of the storage controller and the library manager;

wherein the automated storage administrator is programmed to receive units of removable data storage media into the data storage subsystem by:

the automated storage administrator receiving a first message signalling insertion of one or more media units into the input facility;

the message director routing the first message to the media check-in ELF;

the media check-in ELF, in response to the first message, performing the predetermined actions associated with the media check-in ELF, said predetermined actions including generating a second message requesting a list of media units inserted into the input facility;

the command generator modifying the second message into a predetermined format to create a formatted second message;

the command generator dispatching the formatted second message to the library manager;

the automated storage administrator receiving a third message from the library manager listing the media units inserted into the input facility;

the message director routing the third message to the media check-in ELF;

in response to the third message, for each individual media unit contained in the list:

the media check-in ELF generating a fourth message requesting classification information for the media unit;

the command generator modifying the fourth message into a predetermined format to create a formatted fourth message;

the command generator dispatching the formatted fourth message to the storage controller;

the storage controller consulting the classification database to obtain the requested classification information, and then sending a fifth message representative of the requested classification information;

the automated storage administrator receiving the fifth message;

the message director routing the fifth message to the media check-in ELF;

the media check-in ELF, in response to the fifth message, generating at least one further message to record information representative of the media unit in the classification database;

modifying each further message into a predetermined format to create a corresponding number of formatted further messages; and dispatching each formatted further message to the classification database.

45. The subsystem of claim 44, the classification database including a machine-readable catalog accessible by at least one of the library manager and the storage controller, the sixth message comprising a message requesting recording of a representation of the media unit in the catalog.

46. The subsystem of claim 44, the classification database including a machine-readable category list accessible by at least one of the library manager and the storage controller, the sixth message comprising a message requesting recording of a representation of the media unit in the category list.

47. The subsystem of claim 44, the classification database associating one or more of the media units with one of a predetermined number of predetermined media unit classifications.

48. The subsystem of claim 44, the ELFs further including a labeling ELF having a predetermined labeling process associated therewith, the subsystem further including a process for labeling a media unit, comprising:

the media check-in ELF, in response to the fifth message, applying the process associated with the media check-in ELF to generate a seventh predetermined message advising the labeling ELF of the classification information represented in the fifth message;

the message director modifying the seventh message into a predetermined format to create a formatted seventh message;

the message director dispatching the formatted seventh message to the labeling ELF;

in response to the formatted seventh message, the labeling ELF applying the labeling process to generate an eighth message instructing one of the tape drives to store information on the media unit representative of the associated classification information;

the message director modifying the eight message into a predetermined format to create a formatted eighth message; and the message director dispatching the formatted eight message to the library.

49. The subsystem of claim 44, the predetermined classifications of media units including (1) a first classification representing media units containing data, and (2) a second classification representing media units not containing data.

50. The subsystem of claim 44, the data storage subsystem including a catalog accessible by at least one of the library manager and the storage controller, the predetermined classifications of media units including (1) a first classification representing media units listed in the catalog, and (2) a second classification representing media units not listed in the catalog.

51. The subsystem of claim 44, the media units comprising data storage tape cartridges.

* * * * *